R. M. SWAIN.
AUTOMATIC DIRIGIBLE LIGHT.
APPLICATION FILED AUG. 7, 1916.

1,227,088.                                    Patented May 22, 1917.

Inventor
Roy M. Swain,

Witness
G. E. Logan
J. H. Sherwood

By Franklin N. Hough
Attorney

UNITED STATES PATENT OFFICE.

ROY M. SWAIN, OF PRINCETON, INDIANA.

AUTOMATIC DIRIGIBLE LIGHT.

1,227,088. Specification of Letters Patent. Patented May 22, 1917.

Application filed August 7, 1916. Serial No. 113,595.

*To all whom it may concern:*

Be it known that I, ROY M. SWAIN, a citizen of the United States, residing at Princeton, in the county of Gibson and State of Indiana, have invented certain new and useful Improvements in Automatic Dirigible Lights; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in dirigible lamps for vehicles and consists of a simple and efficient device of this nature, designed especially for use upon an automobile, and so arranged that the lights may be actuated together to throw the light along the track to be traversed by the forward wheels of the machine.

My invention is illustrated in the accompanying drawings which, with the letters of reference marked thereon, form a part of this specification and in which.

Figure 1:
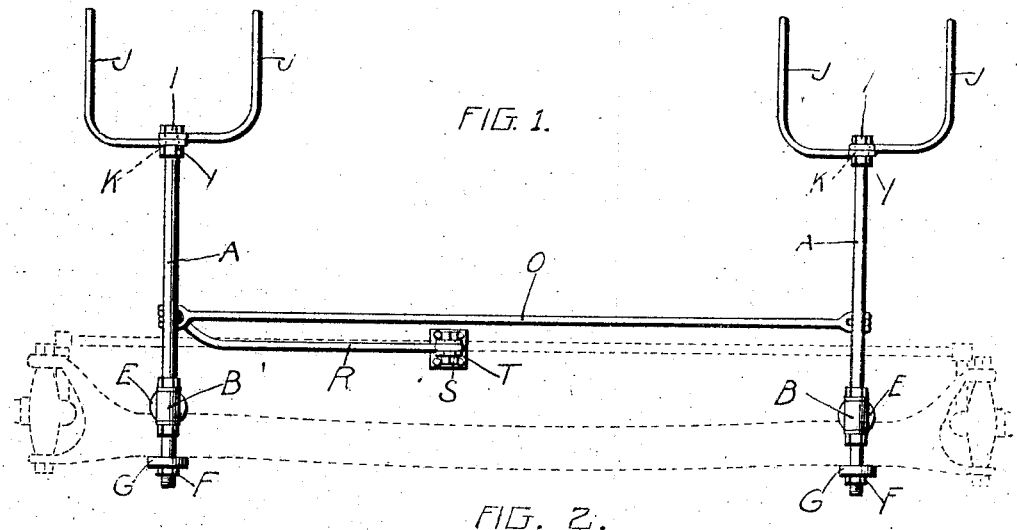
Figure 1 is a front elevation.
Figure 2:
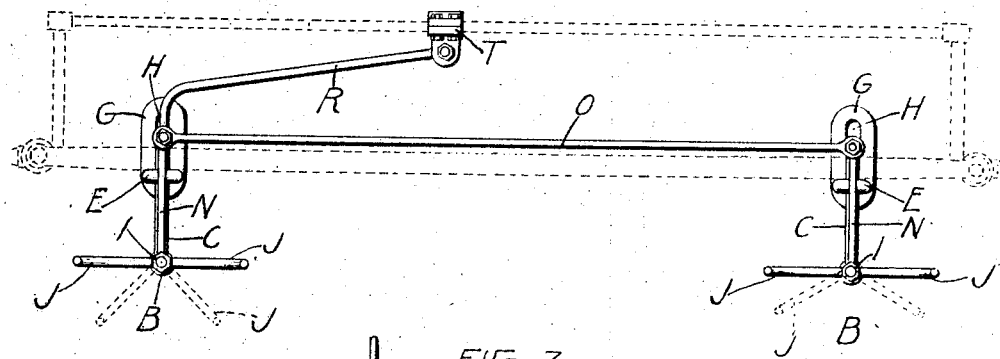
Fig. 2 is a top plan view and Fig. 3 is a detail in edge view of the bracket holding device.
Figure 3:
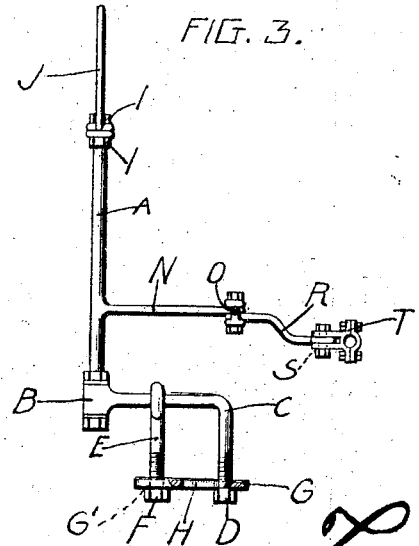

Reference now being had to the details of the drawings by letter, A, A designate two oscillating light supporting rods which are journaled in bearings B, which are formed at the ends of the right angled clamping bars C, one end of each bar C being threaded to receive a nut D. Eye bolts, designated by letter E, receive said bar C and each has a nut F upon a threaded portion thereof. Plates, designated by letter G, are provided each with an elongated slot H to receive the angled end of a bar C and each has an aperture G' for the reception of an eye bolt. Said plates and the angled bars before referred to are adapted to form clamping means whereby the lights may be held in different adjusted positions upon the forward axle of an automobile. Each of said light supporting rods has nuts I, I mounted upon threaded portions of the rods near their upper ends and J, J designate light supporting bracket members, each having an eye K at corresponding ends which are pivotally mounted upon the rod intermediate said nuts. Said members J may be held in different positions upon the rod by means of the nuts which frictionally engage the eyes thereof, adapting the same for supporting lamps of different sizes, said bracket members being adapted to engage lamps in any suitable manner for illuminating the track to be traversed by an automobile equipped with the apparatus. Each rod A has a laterally extending arm N, terminating in an eye at its outer end and O is a rod, forked at its end, each arm of the fork being turned into an eye and having pivotal connection with an eye at the end of one of said arms, thus connecting the two rods so that they will oscillate in unison.

A rod, designated by letter R, is pivotally connected at one end to a strap T, adapted to clamp the steering rod of the frame and the other end is formed into an eye as at S and has pivotal connection with one end of the lever O which connects the arms N.

The operation of my invention will be readily understood and is as follows:—

When the apparatus is applied to the frame of an automobile, the lights, it will be noted, will be actuated automatically by reason of their connection with the steering mechanism, thus causing the lights to follow the tracks to be traversed by the wheels of the automobile.

What I claim to be new is:—

A dirigible light for automobiles comprising axially rotatable lamp supporting posts, brackets adjustably mounted upon the upper portions thereof, a right angled bracket member having a bearing at one end thereof in which said post is journaled, nuts mounted upon the lower threaded end of said post, one upon either side of said bearing, a screw eye through which a horizontally disposed portion of said bracket passes, a clamping plate having apertures to receive the lower threaded ends of said bracket member and screw eye, nuts upon the bracket member and screw eye and adapted to bear against said plate, an arm projecting from said post, and means connected to said arm for rocking the latter.

In testimony whereof I hereunto affix my signature in presence of two witnesses.

ROY M. SWAIN.

Witnesses:
 HOMER KESSNER,
 EARL G. MOYEL.